US008170788B2

(12) United States Patent
Sjögren et al.

(10) Patent No.: US 8,170,788 B2
(45) Date of Patent: May 1, 2012

(54) METHOD AND APPARATUS FOR USING AN AUTOMATED LANE KEEPING SYSTEM TO MAINTAIN LATERAL VEHICLE SPACING

(75) Inventors: Agneta Sjögren, Västra Frölunda (SE); Achim Beutner, Angered (SE)

(73) Assignee: Volvo Technology Corporation, Göteborg (SE)

( * ) Notice: Subject to any disclaimer, the term of this patent is extended or adjusted under 35 U.S.C. 154(b) by 804 days.

(21) Appl. No.: 12/302,816

(22) PCT Filed: Jun. 11, 2007

(86) PCT No.: PCT/SE2007/000565
§ 371 (c)(1),
(2), (4) Date: Nov. 28, 2008

(87) PCT Pub. No.: WO2007/145564
PCT Pub. Date: Dec. 21, 2007

(65) Prior Publication Data
US 2009/0157247 A1    Jun. 18, 2009

Related U.S. Application Data

(60) Provisional application No. 60/804,445, filed on Jun. 11, 2006.

(51) Int. Cl.
*G06F 17/10* (2006.01)
(52) U.S. Cl. ............... 701/301; 701/41; 701/23
(58) Field of Classification Search .......... 701/23–27, 701/207–209, 300, 301, 41, 42, 44, 408, 701/409; 180/167–169
See application file for complete search history.

(56) References Cited

U.S. PATENT DOCUMENTS

| | | | | |
|---|---|---|---|---|
| 5,913,375 | A | | 6/1999 | Nishikawa |
| 6,005,492 | A | * | 12/1999 | Tamura et al. ............... 340/937 |
| 6,092,619 | A | * | 7/2000 | Nishikawa et al. ........... 180/446 |
| 6,169,940 | B1 | * | 1/2001 | Jitsukata et al. ............... 701/23 |
| 2005/0228588 | A1 | | 10/2005 | Braeuchle et al. |
| 2009/0138201 | A1 | | 5/2009 | Eckstein et al. |

FOREIGN PATENT DOCUMENTS

| | | |
|---|---|---|
| DE | 10336986 A1 | 3/2005 |
| DE | 102004054720 A1 | 5/2006 |
| EP | 1457947 A1 | 9/2004 |
| EP | 1457947 B1 | 9/2004 |
| EP | 1502166 B1 | 2/2005 |
| WO | 03091813 A | 11/2003 |
| WO | 2005014370 A1 | 2/2005 |
| WO | 2006037445 A1 | 4/2006 |

(Continued)

OTHER PUBLICATIONS

International Search Report for corresponding International Application PCT/SE2007/000565.

(Continued)

*Primary Examiner* — Richard M. Camby
(74) *Attorney, Agent, or Firm* — WRB-IP LLP

(57) ABSTRACT

A method and apparatus for piloting a vehicle is herein disclosed. The method entails first using a lane keeping system to detect objects in lanes adjacent to the lane currently occupied by the vehicle and then adjusting the position of the vehicle within the occupied lane-relative to a detected object.

19 Claims, 8 Drawing Sheets

FOREIGN PATENT DOCUMENTS

WO   2006050879 A1   11/2006

OTHER PUBLICATIONS

International Preliminary Report on Patentability for corresponding International Application PCT/SE2007/000565.

European Search Report for corresponding European Application EP07748228 (explaining relevance).

International Preliminary Report on Patentability from corresponding International Application PCT/SE2007/000565.

* cited by examiner

METHOD AND APPARATUS FOR USING AN AUTOMATED LANE KEEPING SYSTEM TO MAINTAIN LATERAL VEHICLE SPACING

The present application claims the benefit of U.S. Provisional Application No. 60/804,445 filed Jun. 11, 2006 and entitled "Method And Apparatus For Maintaining Vehicle Spacing While Under The Influence Of An Automated Lane Keeping System", said application being expressly incorporated herein by reference in its entirety, including exhibits thereto.

BACKGROUND AND SUMMARY

The present disclosure generally relates to vehicle piloting. More particularly, the disclosure relates to using known automated lane keeping systems to adjust the position of a vehicle within the vehicle's currently occupied lane in response to a vehicle or obstacle detected in an adjacent lane.

Currently, there are known automated systems which help to ensure that a vehicle remains in an intended driving lane. Normally the lane keeping support function (also referred to herein as a "lane keeping system" causes the vehicle to assume a center position within the driving lane as an optimal driving position. An example of such a system is described in U.S. Pat. No. 5,913,375 which issued to Masao Nishikawa on Jun. 22, 1999 (hereinafter referred to as "the '375 patent" and fully incorporated in this disclosure by reference). FIG. 1 illustrates the components of the exemplary lane keeping system described in the '375 patent. Because the '375 patent is fully incorporated herein, a detailed description of the function of each component in FIG. 1 will not be repeated. In pertinent part, FIG. 1 shows the following components: a charge-coupled device (CCD) TV camera 10 mounted in the vehicle for capturing a view of the road ahead of the vehicle-including lines which function to mark the boundaries of driving lanes; front and side/back radars 12a and 12b, respectively (back radars not shown in FIG. 1), mounted in the vehicle to detect the presence of obstacles such as other vehicles in adjacent lanes; and a control unit 60 which processes the data obtained by the previously mentioned components and provides an output signal which is used to steer the vehicle and keep the vehicle centered within a particular driving lane—without driver intervention.

FIGS. 2a and 2b illustrate a more detailed exemplary schematic of the control unit of FIG. 1, as described in the '375 patent. The schematic of FIGS. 2a and 2b shows that control unit 60 includes a central microprocessor CPU1 which processes the data obtained by the camera 10. (This data may be referred to herein collectively as an example of "occupied lane boundary information" because it essentially represents the location of the outside lane lines of the driving lane currently occupied by the vehicle). A CPU2 processes the data obtained by side radars 12b in combination with the output of CPU1 and generates the output signal used to steer the vehicle (as mentioned above) via motor amplifier 62 and bias motor 34.

FIG. 3 illustrates an example of the driving lane boundary parameters analyzed by the control unit of FIG. 1, as described in the '375 patent. In FIG. 3, "N" represents the outside lane lines of the current driving lane, "M" represents the desired center driving line within the lane, "L" represents the distance between the outside lane line and the desired center driving line, and "δL" and "θV" enable the lane keeping system to keep track of how the vehicle is oriented with respect to the desired driving line. In summary, the '375 patent lane keeping system uses the parameters illustrated in FIG. 3 to keep the vehicle along desired driving line "M".

The present disclosure appreciates the fact that, systems such as the example described in the '375 patent do not account for vehicles or other objects in lanes adjacent to the lane currently occupied by the vehicle. If a vehicle is present in the adjacent lane, and especially if the lanes are narrow and the lateral distance between the vehicles is small, a lateral displacement of the system-carrying vehicle in its own ("occupied") lane is desirable to increase the lateral distance away from the adjacent vehicle. In addition, typical stand-alone lane keeping functions ("lane keeping systems") disengage when the turn signal indicator is actuated signifying that the driver desires to change lanes. Thus, known systems provide no warning to a driver changing lanes of possible obstacles in the new driving position, such as another vehicle.

Thus, what is needed is a method and apparatus which overcomes the above mentioned shortcomings in the prior art.

In accordance with an embodiment of the present invention, a vehicle is piloted by first using a lane keeping system to detect objects in lanes adjacent to a lane occupied by the vehicle and then adjusting the position of the vehicle within the occupied lane, relative to at least one detected object.

DETAILED DESCRIPTION

Figure 4A:
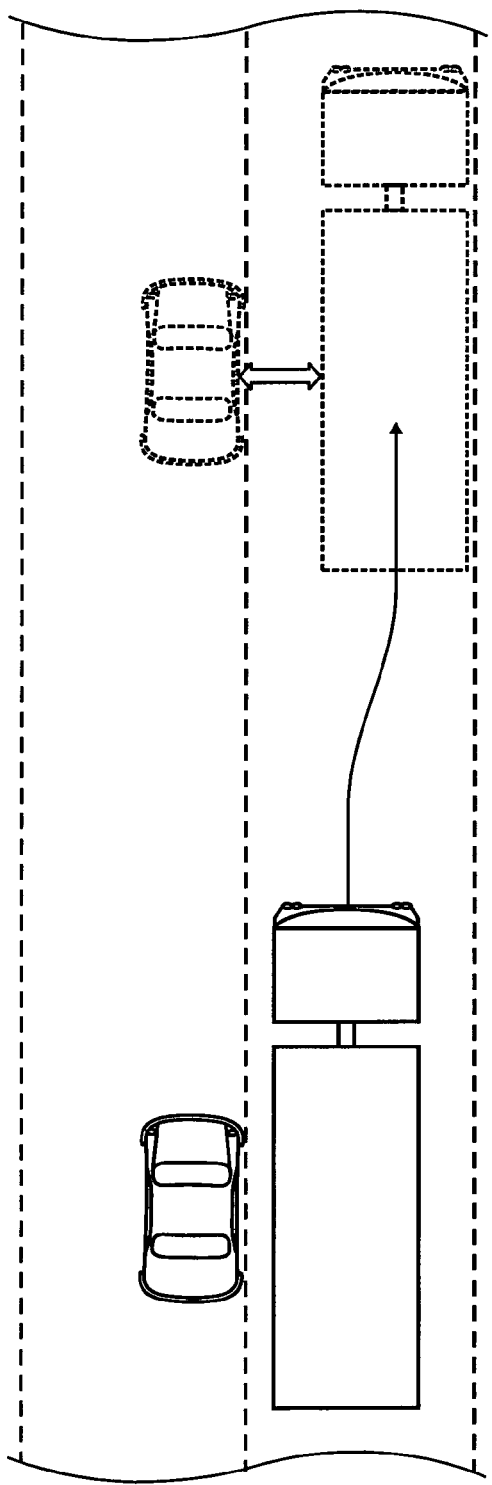
FIGS. 4a and 4b includes two diagrams showing driving lines which can be executed by a vehicle equipped with an embodiment of a system in accordance with the present invention.
Figure 4B:
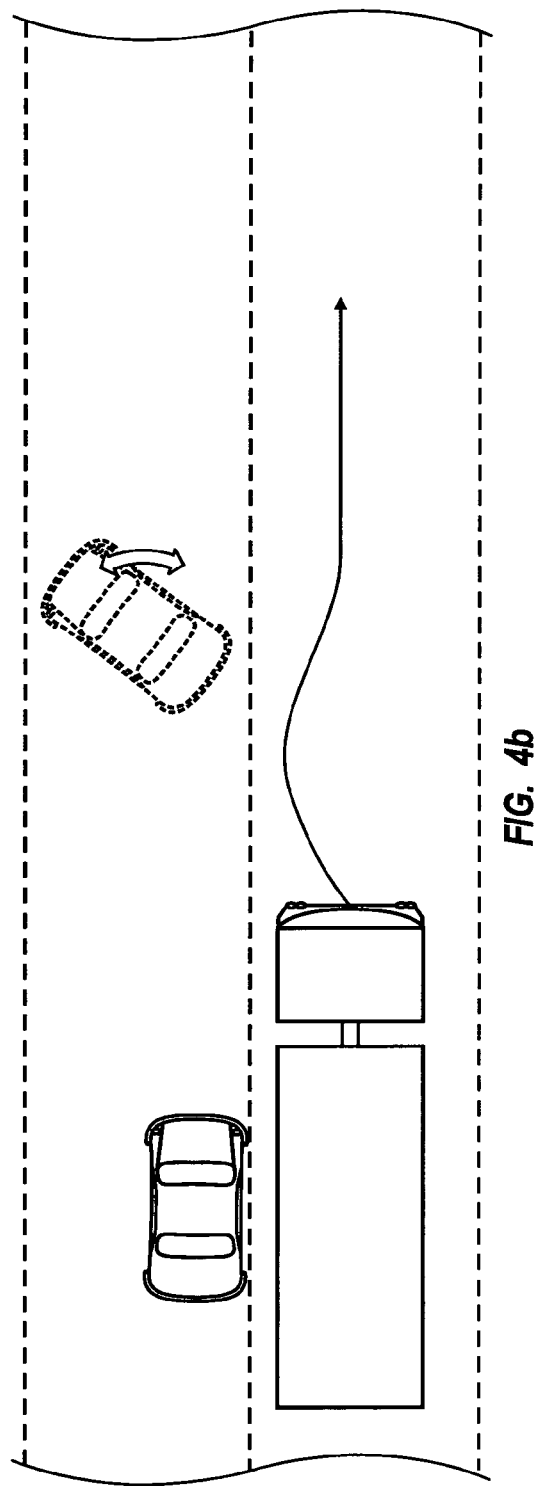

FIGS. 4a and 4b include two diagrams showing driving lines which can be executed by a vehicle equipped with an embodiment of a system in accordance with the present invention. These two examples help to illustrate the advantages of the present invention over current lane keeping systems, hi FIG. 4a, the boundaries of two driving lanes are indicated by hashed lines marked on the road surface. On the left side of FIG. 4a, a truck equipped with a system in accordance with an embodiment of the present invention is traveling in close proximity to the left side boundary of the truck's driving lane. Also on the left side of FIG. 4a, a car is traveling next to the truck in an adjacent driving lane. The car is in close proximity to the right side boundary of the car's driving lane. The right side of FIG. 4a shows what happens a few seconds in time after the scenario depicted in the left side of this same diagram. As indicated by the solid vector (which represents the driving line of the truck) emanating from the front of the truck in the left side of this diagram, the present invention system mounted on the truck detected the proximity of the car to the truck and steered the truck toward the right side of the truck's driving lane to increase the lateral distance between the car and the truck. As shown in FIG. 4a, a currently known lane keeping system with a modified lane keeping algorithm in accordance with the present invention considers a different desired lane position when close vehicles in adjacent lanes are present.

In FIG. 4b, the driving line shows how an embodiment of the presently disclosed system responds by keeping the truck equipped with this inventive system from changing lanes and colliding with the adjacent car after the truck driver enables his turn signal indicator and begins turning the truck's steering wheel to change lanes. The present invention's adaptive lane keeping support ("lane keeping system") with lateral monitoring function uses the information about the presence of a vehicle in the adjacent lane to ensure that the lane keeping function is not disabled when there is a risk of collision in case of a lane change. As depicted in FIG. 4b, the lane keeping function is not disengaged due to the driver's use of the turn indicator because that would enhance the risk of a collision with the car.

A primary goal of the presently disclosed adaptive lane keeping support function with lateral monitoring is to support the driver in his lane keeping task. Furthermore, the present invention assists the driver in adapting his position within the currently occupied lane by considering the presence of other vehicles. The present invention accomplishes these goals and others in various embodiments representing different levels of function. These functional levels range from modifying parameters in the lane keeping support algorithm to actively correcting the vehicle's position in the lane using the vehicle's steering actuator. In another embodiment of the present invention, the existence of an adjacent vehicle is visually presented to the driver.

The function of the present invention can be classified as an intervening function that can be overridden by the driver. Typically, the function will intervene in the sense that it will produce a steering torque. However, the level of the torque can be adapted in order to result in different means of assistance ranging from pure information or recommendation to a complete automatic steering takeover (as illustrated in FIG. 4b).

Figure 5:
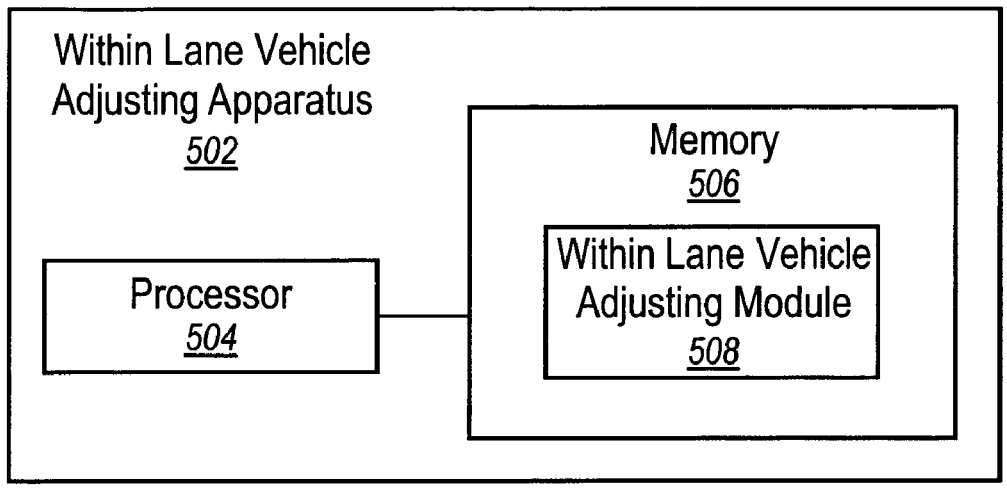
FIG. 5 is a block diagram of a within-lane vehicle adjusting apparatus, in accordance with an embodiment of the present invention.

FIG. 5 is a block diagram of a within-lane vehicle adjusting apparatus, in accordance with an embodiment of the present invention. In FIG. 5, a within-lane vehicle adjusting apparatus 502 comprises a processor 504 adapted to be connected to a computer readable memory 506. Processor 504 may be, for example, an Intel Pentium® microprocessor. Computer readable memory 506 stores computer program code segments which, when executed by processor 504, implement the main functionality of this embodiment of the invention. These computer program code segments are included inside a within-lane vehicle adjusting module 508. Although the computer program code segments in this embodiment of the invention are shown in one module, it can be appreciated that this module can be further separated into more modules and still fall within the scope of the present invention.

Figure 2A:
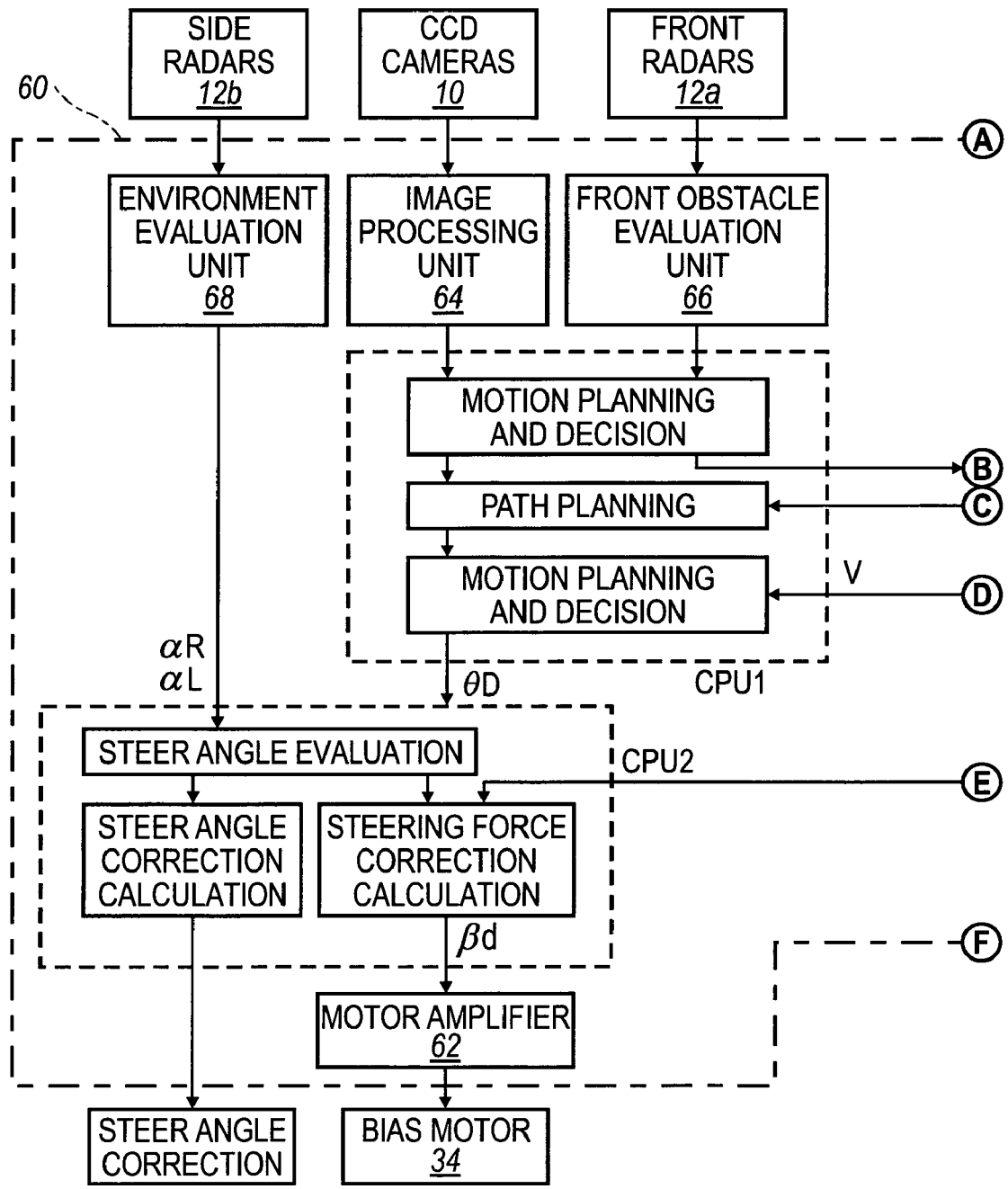
FIGS. 2a and 2b illustrate a more detailed exemplary schematic of the control unit of FIG. 1, as described in the '375 patent.
Figure 2B:
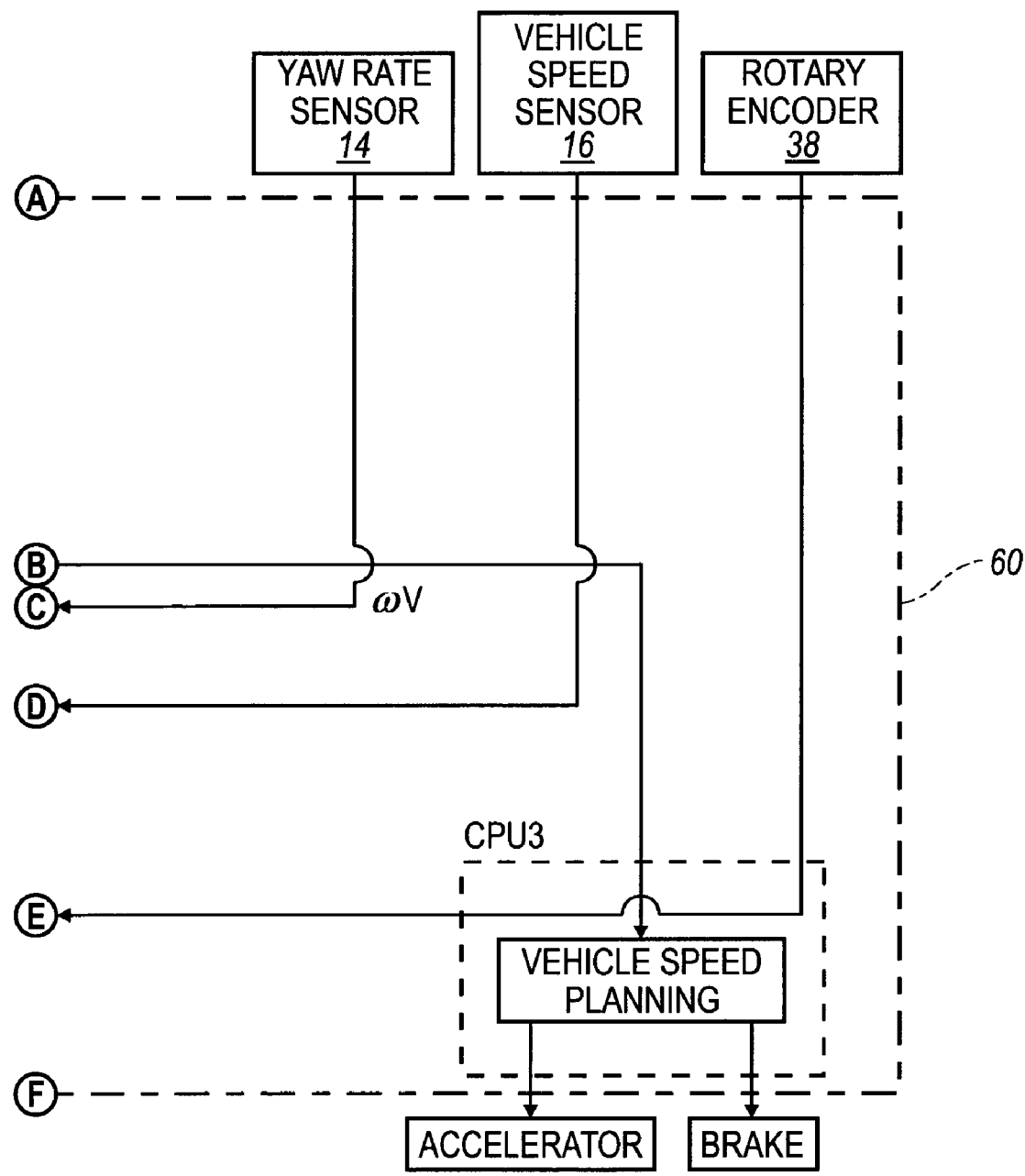
Figure 3:
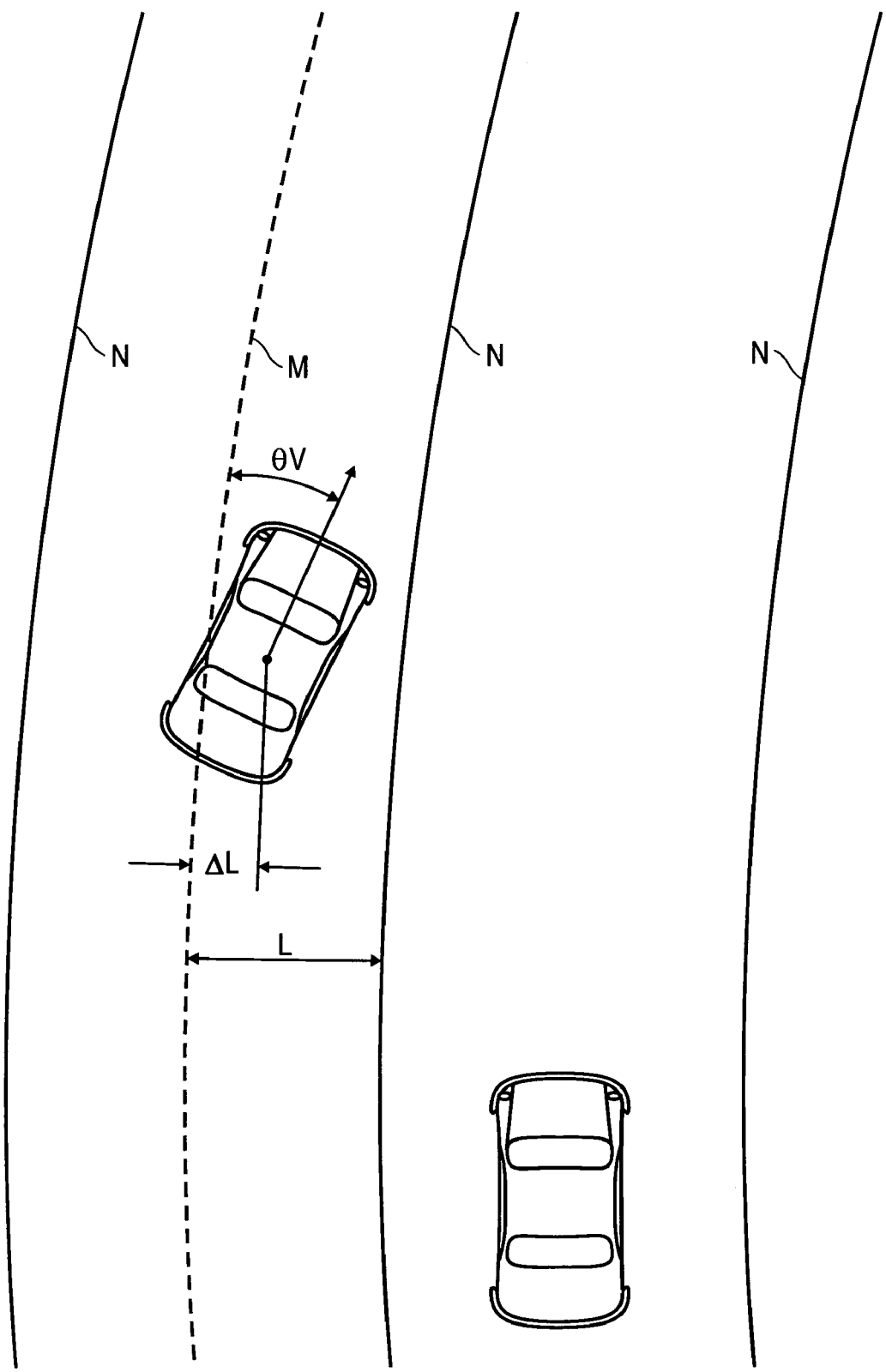
FIG. 3 illustrates an example of the driving lane boundary parameters analyzed by the control unit of FIG. 1 as described in the '375 patent.
Figure 6:
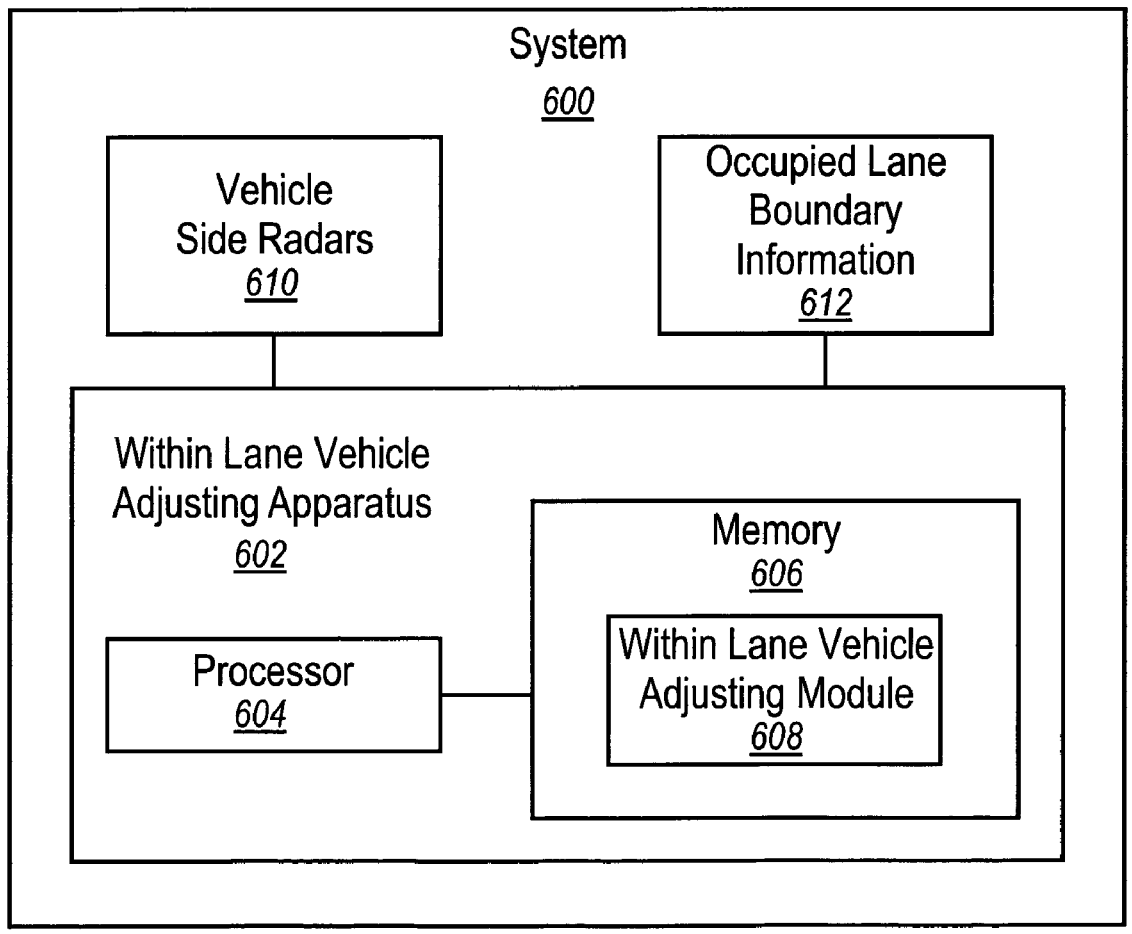
FIG. 6 is an example of a system suitable for practicing an embodiment of the present invention.

FIG. 6 illustrates a system suitable for practicing an embodiment of the present invention, hi FIG. 6, the apparatus of FIG. 5 is incorporated within or associated with a lane keeping system such as the system described in the '375 patent. The resulting combination is identified as system 600 in FIG. 6. Those skilled in the art will understand that the integration of the method and apparatus of the present invention can also be accomplished by modifying the algorithm within an existing lane keeping system to include the functionality inside within-lane vehicle adjusting module 508—without incorporating the remaining elements (602, 604, and 606 of a present invention apparatus) shown in exemplary FIG. 6. The functionality inside within-lane adjusting module 508 may be executed, for example, by a processor within the prior art lane keeping system such as CPU2 shown in FIG. 2a of this disclosure. An example of the functionality included inside within-lane vehicle adjusting module 508 will be described in greater detail below with respect to FIG.

For clarity, only pertinent components of the lane keeping system are shown in FIG. 6. As shown in FIG. 6, one embodiment of the current system in accordance with the present invention entails either within-lane vehicle adjusting apparatus 602 or within-lane vehicle adjusting module 608 receiving the following 2 categories of information from the lane keeping system: [1] information regarding objects in adjacent lanes via vehicle side radars 610 such as described in the '375 patent—alone or in combination with other hardware and/or software) and [2] occupied lane boundary information from component 612 (wherein component 612 may be, for example, camera 10 described in the '375 patent—alone or in combination with other hardware and/or software).

Figure 7:
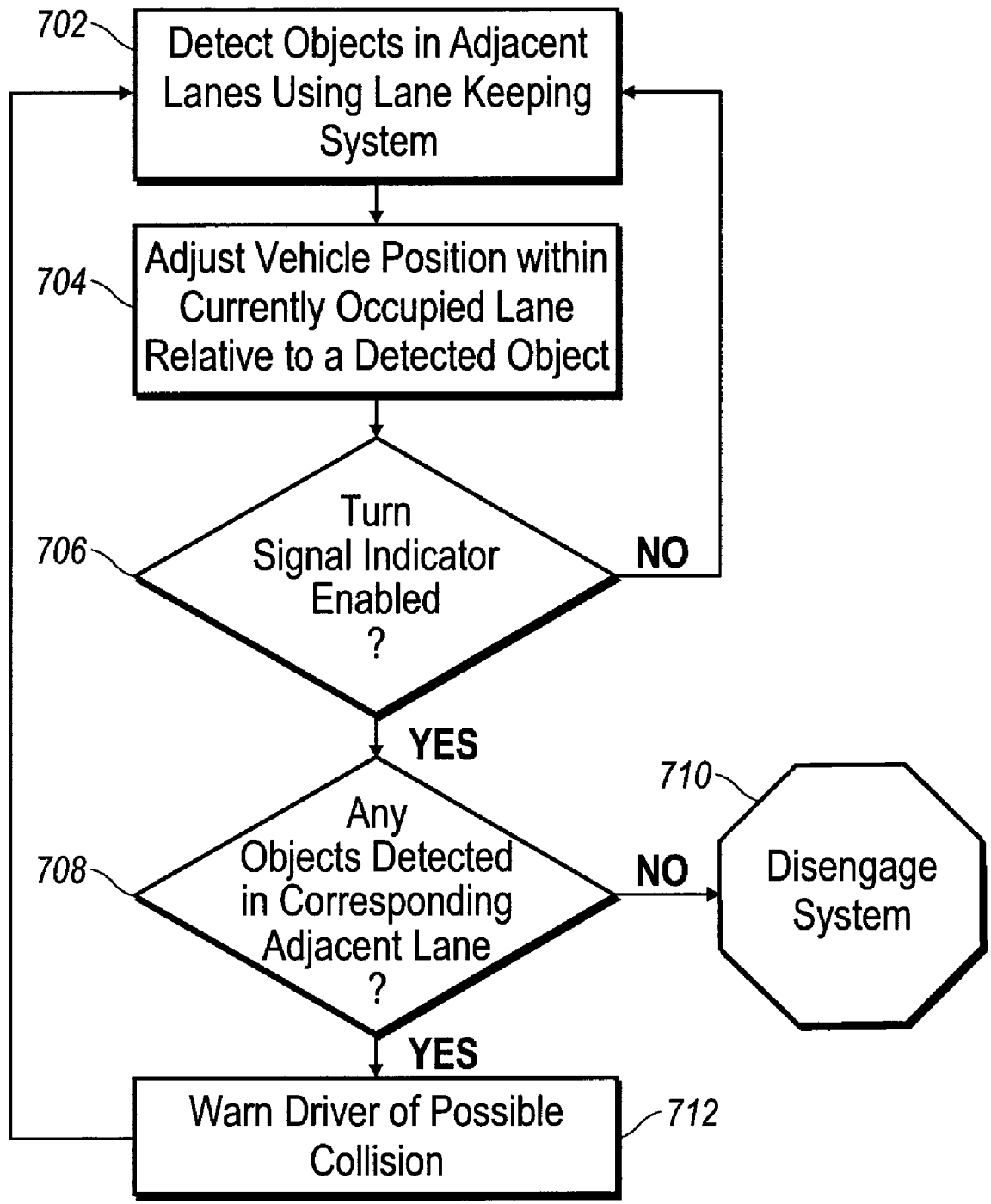
FIG. 7 is a flow chart showing an example of present invention method steps which may be stored, inside the within-lane vehicle adjusting module of FIG. 5 (and inside the within-lane vehicle adjusting module of FIG. 6), as computer program code segments.

FIG. 7 is a flow chart showing an example of method steps of the present invention that may be stored inside the within-lane vehicle adjusting module 508 of FIG. 5, and similarly inside the within-lane vehicle adjusting module 608 of FIG. 6, as computer program code segments. The flow chart of FIG. 7 may be implemented, for example, as a computer program or as computer hardware using well-known signal processing techniques. If implemented in software, the computer program instructions may be stored in computer readable memory, such as Read-Only Memory (ROM), Random Access Memory (RAM), magnetic disk (e.g., 3.5" diskette or hard drive), optical disk (e.g., CD-ROM), or another type of storage media such as a Sony® Micro Vault™ USB storage media.

Figure 1:
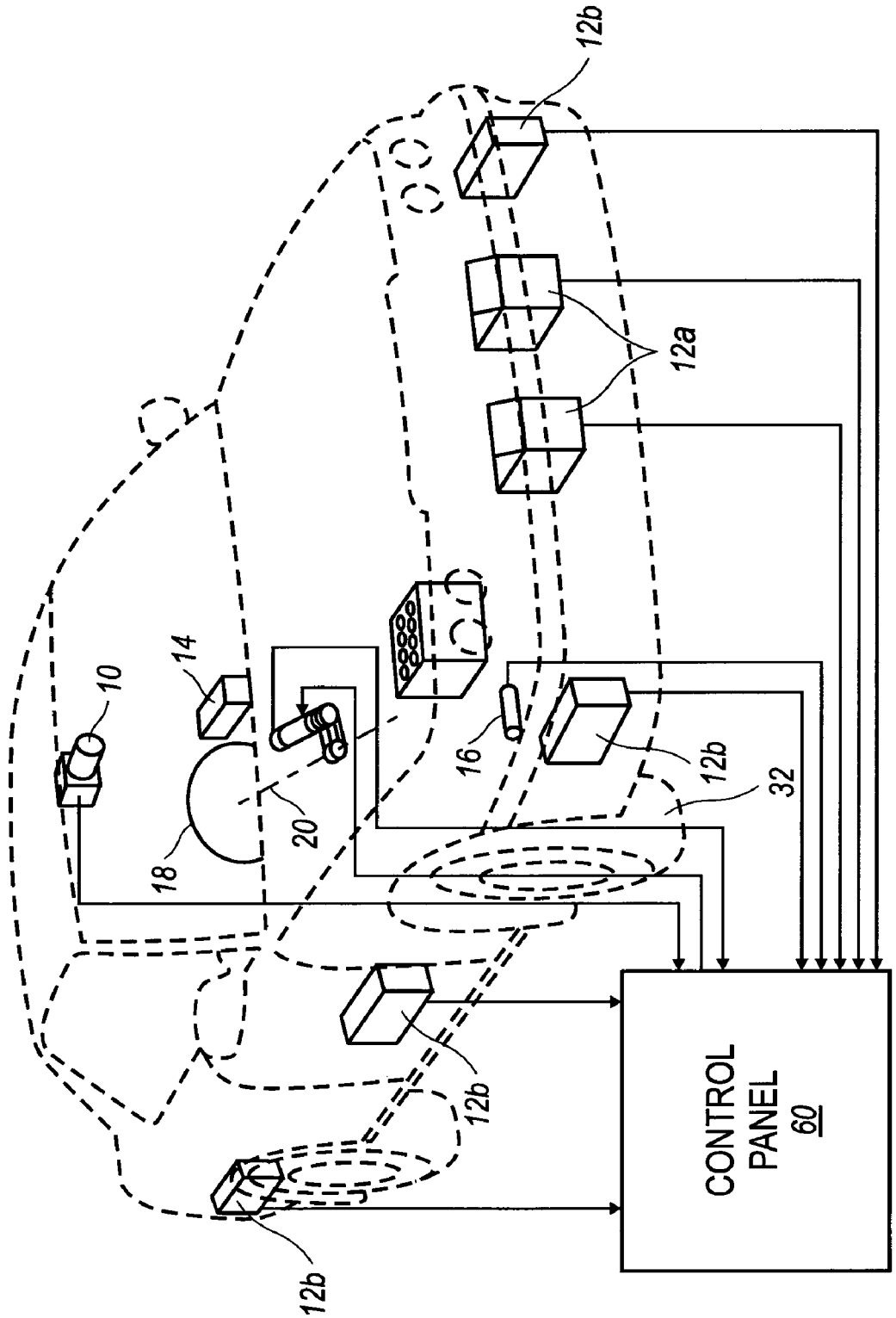
FIG. 1 illustrates the components of an exemplary lane keeping system as described in U.S. Pat. No. 5,913,375 ("the '375 patent")

After the present invention system is enabled (for example: by the driver turning on the ignition of the host vehicle, by the vehicle reaching a preset speed, or by the driver manually enabling the system), the system (in step 702) uses the hardware and/or the software resources of the lane keeping system to detect objects in lanes adjacent to the lane currently occupied by the present invention equipped vehicle. Examples of these lane keeping system resources may include (but are not limited to) various combinations of the following: radars 12b as shown in FIG. 1 of this disclosure, environmental evaluation unit 68 shown in FIG. 2a of this disclosure, optical sensors, and infrared sensors. Upon detecting an object in an adjacent lane, (in step 704) the system adjusts the position of the present invention equipped vehicle within the currently occupied driving lane to put additional lateral space between the detected object and the equipped vehicle. The resources required to accomplish step 704 may include (but are not limited to) various combinations of the following: a within-lane processing module adapted to receive both object detection information and occupied lane boundary information from a lane keeping system, and hardware/software to provide an output signal used to steer the present invention equipped vehicle (for example, the corresponding hardware/software described in the '375 patent).

Next, in step 706, the system checks to determine whether the driver has actuated the turn signal indicator signifying that the driver intends to change lanes. (Note: In another embodiment of the present invention, step 706 may entail—alternatively or additionally—inquiring as to whether the driver has turned the steering wheel of the vehicle equipped with a system configured according to the present disclosure to signify that the driver intends to change lanes). If the answer to the query in step 706 is "no", the system returns to step 702. If the answer to this query is "yes", the system then proceeds to step 708 to determine if any objects are currently detected in the lane signified by the driver (e.g., in lanes corresponding to the same side of the system-equipped vehicle as the enabled turn signal detector). If the answer to this query is "yes", the system proceeds to step 712 and warns the driver (using, for example, one or more of the following: a display monitor on the vehicle's dashboard, an audible alarm, or steering wheel feedback such as vibrating the steering wheel or delivering a torque to the steering wheel). In another embodiment of the invention, the system (in step 712) may actively prevent a possible collision by automatically executing an appropriate steering maneuver. If the answer to the query in step 708 is "no", the system is disengaged. Upon completing step 712, the system returns to step 702.

Figure 8:
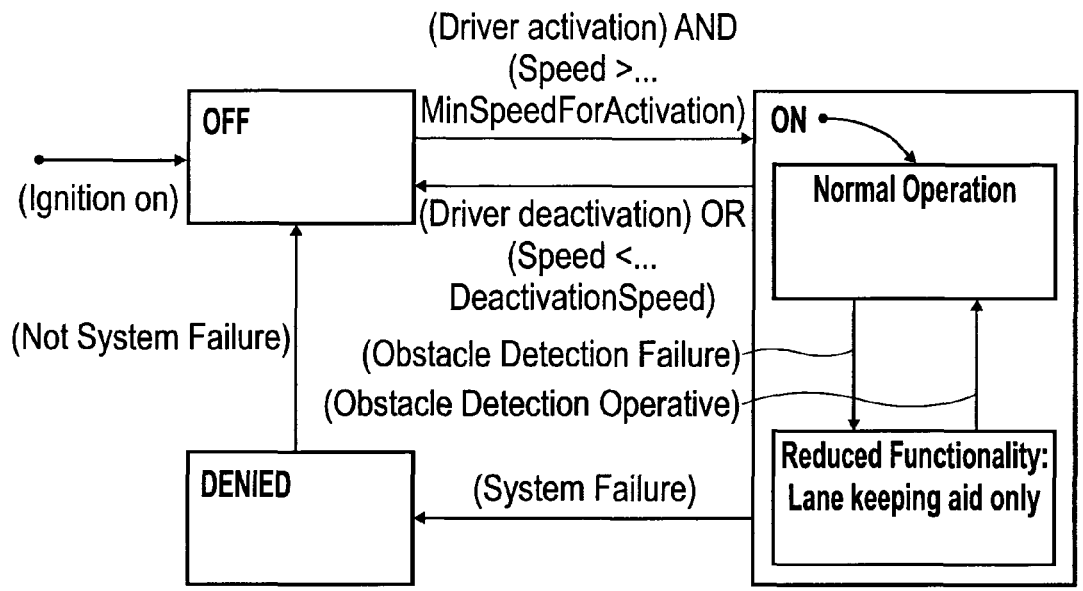
FIG. 8 is a flow diagram showing an example of present invention functions which may be stored, inside the within-lane vehicle adjusting module of FIG. 5, as computer program code segments.

The function of the present invention adaptive lane keeping support with lateral monitoring can be either "on" or "off" or, in case of a system failure, "denied". The default condition when "switching on" the ignition may be, for example, that the present invention system is in "off-mode". The function can be activated and deactivated by the driver through an input device such as a push button. Driver override should also be possible by applying a higher steering wheel torque than the torque executed by the present invention system. FIG. 8 illustrates the main operational modes of another embodiment of the present invention adaptive lane keeping support system with lateral monitoring.

The supported driving task function assists the driver with the lane keeping task, including adaptation of positioning within lane based on consideration of the lateral distance to other vehicles in adjacent lanes.

With respect to user requirements and system reliability, it is important that failures that could result in an incorrect steering maneuver are detected so that the present invention system can be shut off and put in "denied" mode as depicted in FIG. 8.

When the side obstacle detectors are not operating correctly, standard lane keeping aid functionality still provides a valuable benefit to the user and a degraded operational mode can be accepted. This degraded operational mode is then indicated to the driver.

Considering visibility, the present system operates during day light and is operative in standard automotive ranges for temperature and other climate characteristics. The present invention system incorporates the same electromagnetic compliance (EMC) rules as the host vehicle.

Regarding infrastructure, the presently disclosed inventive system is useable on roads whether or not lane markings are present. The prioritization among road types is a highway with two or more lanes in each direction. However, the present system is operable on roads with fewer lanes. The system is operable on (but not limited to) roads with a road curvature radius of 250 m and above.

The present system is operable in all traffic densities from free flowing traffic to high density. The system is also operational in both left hand and right hand traffic. However, in traffic jam situations, the system need not be operational.

Regarding interaction with Human-Machine Interface (HMI), an embodiment of the present system first informs the driver of the presence of a vehicle laterally located on either side of the vehicle, whether in the driver's blind spot, or not, by using the display of a Forward Lateral Rear Monitoring (FLRM) component.

More directly related to the adaptive lane keeping support function of the present invention is that internal parameters in the lane keeping support algorithms adapt to the situation and thus influence the behavior of the function through active steering and other HMI means.

System input can be made directly by the driver via specific controls. Still further, the driver is able to activate and deactivate the system by using an on/off input.

Indirect driver input is also facilitated via non-specific controls such that the driver can always override the steering action by applying a stronger steering wheel torque than the system applies.

Turn indicator actuation, which in traditional lane keeping systems temporarily disables the lane keeping function to allow the desired lane change, disables the system (in one embodiment) only if there are no vehicles present on the corresponding side of the system-equipped vehicle.

Direct system feedback to the driver can be haptic; that is, directly through the steering wheel. The disclosure of side obstacles to a driver is described above relative the FLRM.

Regarding lane change warning including haptic steering wheel feedback and execution of corrective action, one embodiment of the present invention uses visual and/or audible warnings. As an alternative or additionally, other embodiments use the active steering actuator to provide a haptic warning through a different HMI channel. In addition to a warning, a correction of the steering angle and "prevention" of a lane change maneuver is executed by applying an overlay torque to the steering wheel, as illustrated in FIG. 4*b* of this disclosure.

Driving safety can be enhanced by combining an originally passive lane change warning function (that initially used such things as visual and/or audible warning) with the presently described active steering actuator that provides haptic feedback via the steering wheel. The goal is to avoid safety-compromised driving situations by monitoring the lateral area of the ego-vehicle and [in case of an indicated lane change (e.g., usage of blinkers and actively steering) while another vehicle is present in the lateral area] to issue a warning by haptic feedback (e.g., vibration and corrective action) by using the active steering actuator.

The main function of one embodiment of the present system is a warning function that belongs to the category of non-intervening functions. However, the extension of the function to a corrective steering wheel torque acts as the intervening function. The driver has the ability to override this system action by, for example, applying a higher steering wheel torque.

The present invention lane change warning with haptic steering wheel feedback and corrective action function has "on" and "off" or, in case of a system failure, "denied" operational modes. In one embodiment, the default condition when "switching on" the ignition is that the warning part of the function is in "on-mode". The function can be activated and deactivated by the driver through some kind of input device, such as a push button. The driver may select the desired warning channel. The active intervention part of the function is selectable similar to the ways different warning channels are selectable in various embodiments of the present invention.

Figure 9:
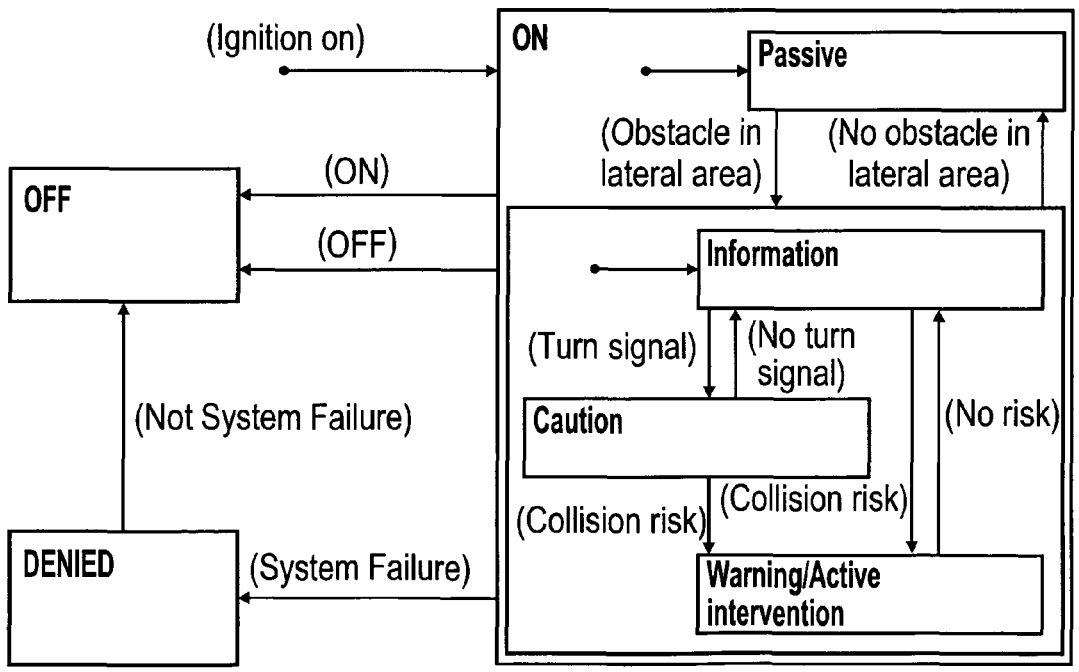
FIG. 9 is a flow diagram showing an example of present invention functions which may be stored, inside the within-lane vehicle adjusting module of FIG. 5, as computer program code segments.

The main operational modes in another embodiment of the present invention for the lane change warning system with haptic steering wheel feedback and corrective action are shown in FIG. 9.

In order to provide a real benefit to the driver, the system detects vehicles in the blind spots. In order to encourage the driver to still use his lateral minors, directional warning channels can be implemented. For instance, in one embodiment, a visual warning is placed close to the side mirrors or a directional sound icon is used.

If the system is not operational, this condition is communicated to the driver.

Regarding HMI and interaction, one embodiment of the present invention system has three levels of driver interaction. Level 1 relates to Information: The system informs the driver of the presence of a vehicle in the lateral area of the ego-vehicle (both sides), whether in blind spot or not, by using the display of the FLRM function. Level 2 relates to Caution: When a vehicle is detected in the lateral area and the driver is using his turn signal the system warns the driver through the selected channel (for example, visual and/or audible). Level 3 relates to Warning/Active intervention: When there is a risk of a lateral collision (due to the ego vehicle's lane change) a corrective steering action is given, or in the case of warning only mode the system warns the driver haptically through the steering wheel.

In yet another embodiment of the present invention system, input is accomplished via specific controls, and the driver is able to activate and deactivate the system by using an on/off input. Indirect driver input via non-PINSAFES also enable specific controls according to the present invention. Other driver inputs that influence the system are the turn signal indicator and the steering wheel movements. The use of the turn indicator makes the present invention system move from information to caution mode (if there is a vehicle detected in the corresponding lateral area). Similarly, the use of the steering wheel triggers the warning/active intervention mode (when there is a vehicle detected in the corresponding lateral area).

Regarding system feedback, direct system feedback is accomplished in some embodiments as indicated above in which there are different levels of system feedback. The FLRM function is used for information to indicate if vehicles are detected on the sides. Visual feedback close to the side mirrors is provided as a means for indicating the necessity for caution. Alternatively, audible directional warnings are used.

Haptic feedback through the steering wheel is used either through steering wheel vibrations (warning only) or through a corrective steering torque (active intervention). The steering wheel vibrations and corrective steering torque can generate a lateral motion of the vehicle.

Although several embodiments are specifically illustrated herein, it will be appreciated that modifications and variations of the present invention are covered by the above teachings and within the purview of the appended claims without departing from the spirit and intended scope of the invention.

What is claimed is:

1. A method for piloting a vehicle, comprising:
   detecting objects in lanes adjacent to a lane occupied by the vehicle using a lane keeping system;
   adjusting, relative to at least one detected object, a lateral position of the vehicle within the occupied lane, wherein a different desired lane position is applied by the lane keeping system based on consideration of a lateral distance to another object in an adjacent lane by modifying parameters in the lane keeping support algorithm,
   in a first level of driver interaction relating to information, informing the driver, via the lane keeping system, of the presence of a vehicle in the lateral area of both sides of the ego vehicle;
   in a second level of driver interaction relating to caution, warning the driver, via the lane keeping system through a selected warning channel, when a vehicle is detected in the lateral area and the driver is using the turn signal indicator; and
   in a third level of driver interaction relating to warning/active intervention, providing a corrective steering action or, in case of warning only mode, warning the driver, via the lane keeping system, haptically through the steering wheel when there is a risk of lateral collision due to a lane change.

2. The method of claim 1, wherein the objects are one of another vehicle and a road structure.

3. The method of claim 1, further comprising the step of:
   warning a vehicle driver that changing from the occupied lane might result in a collision with a detected object.

4. The method of claim 3, wherein the warning step further comprises utilizing steering wheel feedback.

5. The method of claim 4, wherein the steering wheel feedback is one of vibrating the steering wheel and applying a torque to the steering wheel.

6. The method of claim 5, wherein the torque is applied counter to a steering wheel direction of rotation which might result in collision with the detected object.

7. The method of claim 3, wherein the detecting and warning steps are not disabled when a vehicle turn signal indicator is enabled, if a collision with a detected object might result from a lane change.

8. The method of claim 1, wherein the adjusting step further comprises the steps of:
   receiving, from the lane keeping system, information regarding boundaries of the occupied lane; and
   utilizing the received boundary information to ensure the adjusted vehicle position remains within the occupied lane.

9. A computer-readable medium whose contents cause a computer system to pilot a vehicle, by performing the steps of:
   detecting objects in lanes adjacent to a lane occupied by the vehicle, using a lane keeping system;
   adjusting, relative to at least one detected object, a lateral position of the vehicle within the occupied lane by applying a different desired lane position by the lane keeping system based on consideration of a lateral distance to another object in an adjacent lane by modifying parameters in the lane keeping support algorithm,
   in a first level of driver interaction relating to information, informing the driver, via the lane keeping system, of the presence of a vehicle in the lateral area of both sides of the ego vehicle;
   in a second level of driver interaction relating to caution, warning the driver, via the lane keeping system through a selected warning channel, when a vehicle is detected in the lateral area and the driver is using the turn signal indicator and
   in a third level of driver interaction relating to warning/active intervention, providing a corrective steering action or, in case of warning only mode, warning the driver, via the lane keeping system, haptically through the steering wheel when there is a risk of lateral collision due to a lane change.

10. The computer-readable medium of claim 9, wherein the objects are one of another vehicle and a road structure.

11. The computer-readable medium of claim 9, further comprising the step of:
   warning a vehicle driver that changing from the occupied lane might result in a collision with a detected object.

12. The computer-readable medium of claim 11, wherein the warning step further comprises utilizing steering wheel feedback.

13. The computer-readable medium of claim 12, wherein the steering wheel feedback is one of vibrating the steering wheel and applying a torque to the steering wheel.

14. The computer-readable medium of claim 13, wherein the torque is applied counter to a steering wheel direction which might result in the collision.

15. The computer-readable medium of claim 11, wherein the detecting and warning steps are not disabled when a vehicle turn signal indicator is enabled, if a collision with a detected object might result from a lane change.

16. The computer-readable medium of claim 9, wherein the adjusting step further comprises the steps of:
   receiving, from the lane keeping system, information regarding boundaries of the occupied lane; and
   utilizing the received boundary information to ensure the adjusted vehicle position remains within the occupied lane.

17. A system for piloting a vehicle, comprising:
   means for detecting objects in lanes adjacent to a lane occupied by the vehicle; and
   means for adjusting a lateral position of the vehicle, relative to at least one detected object, within the occupied lane using detection information generated by the detecting means by applying a different desired lane position by the lane keeping system based on consideration of a lateral distance to another object in an adjacent lane by modifying parameters in the lane keeping support algorithm,
   wherein, in a first level of driver interaction relating to information, the lane keeping system informs the driver of the presence of a vehicle in the lateral area of both sides of the ego vehicle;
   in a second level of driver interaction relating to caution, when a vehicle is detected in the lateral area and the driver is using the turn signal indicator, the lane keeping system warns the driver through a selected warning channel; and
   in a third level of driver interaction relating to warning/active intervention, when there is a risk of lateral collision due to a lane change, a corrective steering action is given or in case of warning only mode the lane keeping system warns the driver haptically through the steering wheel.

18. The system for piloting a vehicle according to claim 17, comprising:
   a lane keeping system; and
   a within-lane vehicle adjusting module adapted to receive from the lane keeping system both information regarding objects detected in lanes adjacent to a lane occupied by the vehicle and information regarding boundaries of the occupied lane;
   the within-lane vehicle adjusting module utilizing the received information to provide an output signal used to adjust a lateral position of the vehicle within the occupied lane relative to at least one detected object by applying a different desired lane position by the lane keeping system based on consideration of a lateral distance to another object in an adjacent lane by modifying parameters in the lane keeping support algorithm.

19. The system for piloting a vehicle according to claim 18, comprising:
   a processor associated with the lane keeping system;
   a computer readable memory segment adapted to be connected to the processor;
   a within-lane vehicle adjusting module included within the computer readable memory, the within-lane vehicle adjusting module comprising computer program code segments which, when executed by the processor, implement the following steps:
   detecting objects in lanes adjacent to a lane occupied by the vehicle, using the lane keeping system; and
   adjusting, relative to at least one detected object, a lateral position of the vehicle within the occupied lane by applying a different desired lane position by the lane keeping system based on consideration of a lateral distance to another object in an adjacent lane by modifying parameters in the lane keeping support.

* * * * *